United States Patent [19]

Vincent et al.

[11] Patent Number: 5,689,607
[45] Date of Patent: Nov. 18, 1997

[54] DEVICE FOR HOLDING AT LEAST ONE OPTICAL FIBER CABLE, AND A SPLICE BOX MAKING USE OF THE DEVICE

[75] Inventors: Alain Vincent, Juilly; Michel Milanowski, Anserville, both of France

[73] Assignee: Alcatel Cable Interface, Vrigne Aux Bois, France

[21] Appl. No.: 568,586

[22] Filed: Dec. 7, 1995

[30] Foreign Application Priority Data

Dec. 8, 1994 [FR] France .................. 94 14774

[51] Int. Cl.$^6$ .................................................. G02B 6/36
[52] U.S. Cl. .................... 385/136; 385/135; 385/137
[58] Field of Search ............................. 385/134–139

[56] References Cited

U.S. PATENT DOCUMENTS

| | | | |
|---|---|---|---|
| 4,359,262 | 11/1982 | Dolan | 385/135 |
| 4,744,629 | 5/1988 | Bertoglio et al. | 385/137 X |
| 5,181,272 | 1/1993 | Hopper | 385/139 |
| 5,280,556 | 1/1994 | Jones | 385/139 |
| 5,444,810 | 8/1995 | Szegda | 385/139 |
| 5,517,592 | 5/1996 | Grajewski et al. | 385/138 |

FOREIGN PATENT DOCUMENTS

| | | |
|---|---|---|
| 0397587A1 | 11/1990 | European Pat. Off. . |
| 0645656A1 | 3/1995 | European Pat. Off. . |
| 2682775A1 | 4/1993 | France . |
| 2621852 | 11/1977 | Germany . |
| 4231181C1 | 8/1993 | Germany . |
| 9415327.2 | 1/1995 | Germany . |

Primary Examiner—John D. Lee
Attorney, Agent, or Firm—Sughrue, Mion, Zinn, Macpeak & Seas, PLLC

[57] ABSTRACT

A device for holding at least one optical fiber cable includes one fastening support per cable. The device including a cylindrical thimble inside which a plurality of identical fastening supports can be mounted once the corresponding cables are held stationary on them, an end wedge fixed to each support inside said thimble and locked in an open front end of said thimble, and a sealed closure for closing the rear portion of the thimble in sealed manner around each cable. Application to splice boxes.

17 Claims, 6 Drawing Sheets

DEVICE FOR HOLDING AT LEAST ONE OPTICAL FIBER CABLE, AND A SPLICE BOX MAKING USE OF THE DEVICE

The present invention relates to equipment for holding optical fiber cables stationary so that their optical fibers can be coiled and interconnected. The invention relates more particularly to a device for holding at least one optical fiber cable, and to a splice box making use of the device.

BACKGROUND OF THE INVENTION

The cables are of known type, and such a cable includes a strength member and/or a grooved rod, a plurality of fibers around the strength member or in the grooves of the rod, and an outer protective sheath.

The fibers are often placed individually or in sets inside protective tubes. Generally, peripheral reinforcing members, e.g. in the form of strong textile roving, or of relatively stiff elements, are provided between the fibers and the outer sheath of the cable.

Generally, in known manner, for the purposes of connecting optical fibers from one cable to optical fibers from another cable, the cables are held stationary, while surplus lengths of their fibers extend freely beyond the points at which the cables are held.

Document FR-A-2 682 775 describes a device for fastening an optical fiber cable, which device holds the prepared cable and is removably fixed in a splice box. That device is constituted by a base-plate having a rear portion on which the cable in the non-stripped state is held stationary, and a front portion on which the strength member from the cable in the stripped state is locked, while the fibers released from the periphery of the strength member are free and project from the front of the base-plate. A hole provided in the front end portion of the base-plate makes it possible to fix the base-plate in the splice box by means of a screw, once the cable is held stationary on said base-plate.

The surplus lengths of the fibers from the cables held in this way in the splice box are stored in said box and the splices between the fibers from the cables are held in said box, in general in one or more coiling and splicing cassettes stacked in said box.

A screwdriver is used both to mount each fastening device with its cable in the splice box, and to remove one of the installed devices. Using such a tool in the confined inside space assigned to fixing the fastening devices for fastening the various cables can damage the fibers of any one of the cables. The fastening devices fixed side by side in the splice box limit the capacity for receiving such devices in the inside space assigned to them. Furthermore, such devices require sealing to be provided at accesses provided for them on the splice box, so that the fibers coiled and spliced in the splice box are suitably protected.

OBJECTS AND SUMMARY OF THE INVENTION

An object of the present invention is to avoid such drawbacks by providing a device for holding one or more cables, which device does not require any tools to be used inside the splice box on installing or removing the device, and includes integrated sealing for each corresponding cable.

The present invention provides a device for holding at least one optical fiber cable, the device including a fastening support for each cable, the corresponding cable being held stationary on a fastening face of the support and having its fibers disposed freely on a front end of said support, said device further including a cylindrical thimble inside which a plurality of identical fastening supports can be mounted for receiving a plurality of corresponding cables, the thimble being organized so that its length is significantly greater than the length of said supports, at least one of said supports being mounted inside said thimble, and each corresponding cable being received therein once it is held stationary on its support, a front end wedge fixed to the front end of each support inside said thimble and locked in an open front end of said thimble, and closure means for closing the rear portion of the thimble, around each cable received in said thimble.

The device advantageously further has at least one of the following additional characteristics:

the fastening support for fastening each cable is constituted by anelongate part having a large face, which is recessed axially over a portion of the length of said part and which defines the fastening face, and a plurality of small plane faces co-operating to define sloping surfaces for mounting a plurality of supports so that they touch one another inside said thimble;

the support is provided with a front end rib projecting axially from the front end portion of the fastening face, and provided with a longitudinal channel, said channel being assigned to locking a central strength member belonging to the cable held stationary on said support;

the support has a semi-circular front end shoulder projecting from said fastening face, and provided with peripheral notches for passing the fibers from the cable held stationary on the support;

a split foam pad is mounted against said shoulder;

said end wedge is a flat bar that is of length greater than the inside diameter of said thimble, and that is assigned to locking, in the front end of said thimble, a single support or two supports disposed symmetrically to and touching each other, and said thimble is provided with at least two front notches that are diametrically opposite each other, and that receive the ends of said bar; and said end wedge is a flat star-shaped piece having three radial arms of length greater than the inside radius of said thimble, and assigned to locking, in the front end of the thimble, three supports touching in pairs, and said thimble is provided with at least three front notches for receiving the ends of the three arms.

The invention also provides a splice box making use of such devices for holding optical fiber cables, the splice box including a splice body and at least two opposite side accesses on said body for the cables whose fibers are interconnected therein, wherein each device is outside the splice box body and further includes front sealed fixing means for fixing said thimble in sealed manner to one of said accesses of the box body.

The splice box may be tubular in shape, and its ends then receive directly respective devices for holding optical fiber cables.

The splice box may, in particular, be rectangular, and it is provided with side accesses on each of its four side faces, each access receiving a respective one of said devices or being closed off, and two of the four faces being used to receive the devices depending on the number of devices to be fixed to their accesses.

BRIEF DESCRIPTION OF THE DRAWINGS

The characteristics and advantages of the present invention appear from the following description of preferred embodiments given by way of example and with reference to the accompanying drawings, in which.

MORE DETAILED DESCRIPTION

Figure 1:
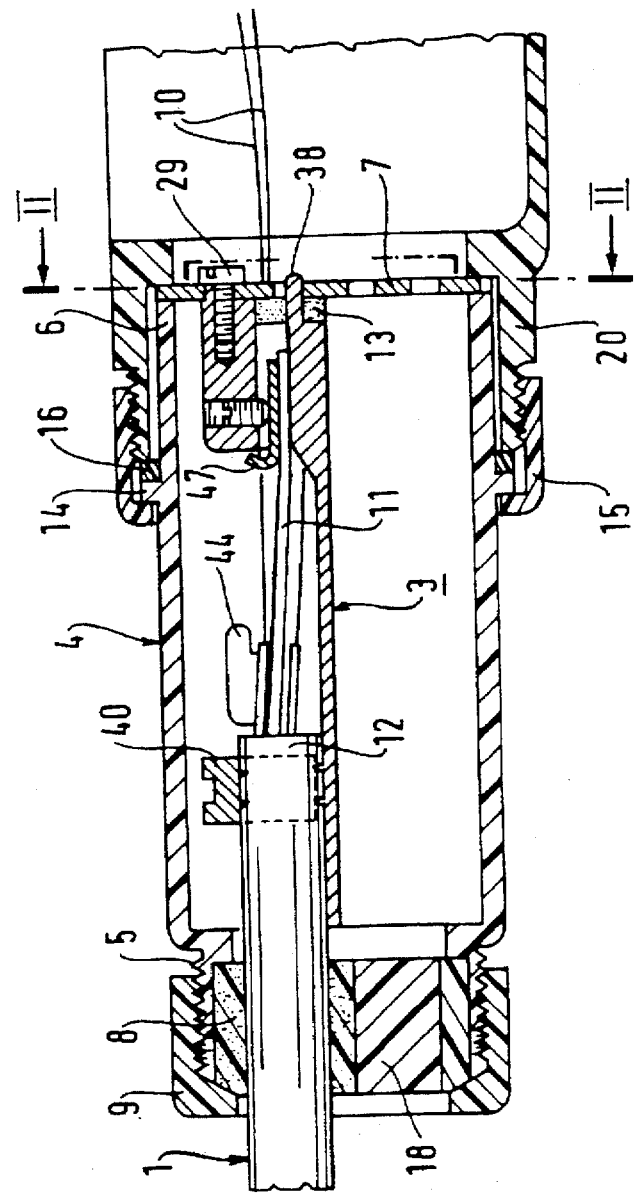
FIG. 1 is a section view of a device of the invention, shown installed on an access of a splice box shown in part only.

FIG. 1 shows a device holding a single cable 1 containing optical fibers 10, the device being fixed to the outside of a splice box 2 on an access 20 of the box. However, it should be noted that the device is designed to make it possible to hold a plurality of optical fiber cables so as to hold them in the same box access, as explained below.

The device shown in FIG. 1 includes a fastening support 3 for fastening the cable 1, and an external thimble 4 which contains the support on which the cable 1 is held stationary. The thimble is cylindrical in shape and it is assigned to optionally receiving a plurality of supports such as support 3. The thimble is open at both ends so that the single received cable 1 can pass through its rear end portion 5 and so that the optical fibers 10 from the cable can pass through its front end portion 6.

The device also includes a front wedge 7 fixed to the "front" end of the fastening support and received in the front opening of the thimble. The wedge positions the fastening support 3 in the front opening and prevents it from rotating relative thereto.

The device further includes a stuffing-box gasket 8 through which the cable 1 passes and which is locked in the rear opening of the thimble and on the cable 1 by means of a nut 9 screwed onto the threaded rear end of the thimble. This gasket positions the cable in the rear opening and seals said opening.

The cable 1 includes a central strength member 11, a plurality of fibers 10 around the strength member and an outer protective sheath 12. In general, and in well known manner, it further includes other elements that are not shown or that are not shown in FIG. 1 to avoid cluttering. For example, the cable may include a grooved rod mounted on the central strength member or constituting said strength member, protective tubes for protecting individual fibers or sets of fibers, means for holding the fibers in the grooves of the rod or around the strength member, and peripheral reinforcing members, preferably textile and in the form of roving, between the outer sheath and the fibers.

The cable in the non-stripped state is held stationary on a rear portion of the support 3, while the strength member from the cable in the stripped state is stopped and retained on the front portion of the support. The bare fibers 10 from the cable in the stripped state extend freely beyond the front portion of the support through the front opening in the thimble containing the support to which the cable 1 is fastened prior to the support being mounted in the thimble.

A foam pad 13 is interposed between the front end of the support and the wedge 7 fixed to said front end. The pad is split so that the bare fibers can pass therethrough.

For the purposes of mounting the thimble 4 in the access 20 of the box 2, a "front" but non-terminal peripheral shoulder 14 on the thimble limits the extent to which the thimble can be inserted into the access. Naturally, the access is cylindrical and its inside diameter is slightly larger than the outside diameter of the front portion of the thimble, but is smaller than the outside diameter of the shoulder 14. The outside of the access is threaded. A nut 15 mounted to slide between the rear portion and the front portion of the thimble, and having an annular rear head which abuts against the rear of the shoulder, is screwed onto the access 20 so as to lock the thimble in the access. A gasket 16 retained against the front of the shoulder 14 is clamped between the shoulder 14 and the peripheral end of the access 20 on tightening the nut 15, and this gasket seals the thimble in the access 20.

Figure 2:
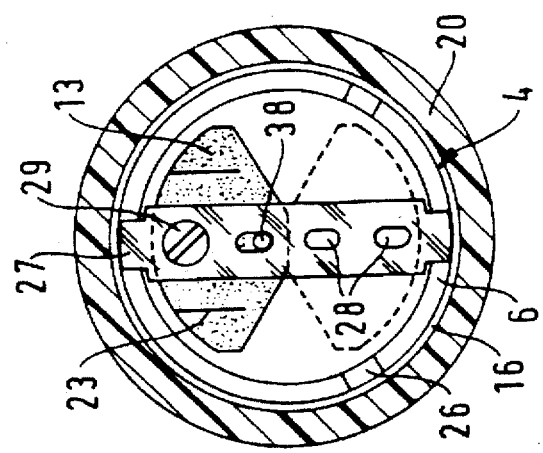
FIG. 2 is a section view on the line II—II shown in FIG. 1, showing a "front" end face of the device.

FIG. 2 shows two splits 23 provided in the pad 13 so that the bare fibers can pass therethrough.

As shown in FIG. 2 and/or in FIG. 1, the front portion of the thimble is provided with notches 26, two of which are diametrically opposite and receive the above-mentioned front wedge 7.

The wedge 7 is a flat rectangular bar. Its length is slightly greater than the inside diameter of the front opening of the thimble. Its width is greater than that of the notches 26 except over its two end portions which define two opposite tabs 27, that have substantially the same width as the diametrically opposite notches and that are received therein.

The wedge 7 is fixed to the support 3 with a small amount of clearance making it possible for the support to move transversely relative to the wedge. The wedge is provided with oblong holes such as 28 along its longitudinal axis, two of the oblong holes being used to fix the wedge to the support. One of the holes receives a fixing screw 29 engaged in the support 3, while the other hole receives a cylindrical positioning lug 38 provided on the front end face of the support.

The end tabs 27 abut against the ends of the respective opposite notches in the thimble when the support 3 carrying the cable 1 is installed in the thimble. The end tabs are held engaged in the notches provided that the rear nut 9 is locked onto the rear portion of the thimble and against the stuffing box through which the cable in the non-stripped state passes, since the nut then opposes any movement in translation of the support in the thimble.

As shown in FIG. 1, the stuffing box 8, through which the cable 1 in the non-stripped state passes, is provided with another cable passage that is not used and that is closed off by means of a plug 18.

The fastening support 3 is described with particular reference to FIGS. 3 to 6.

The support is constituted by an elongate piece of right cross-section that is substantially in the form of an isosceles trapezium whose large base is recessed over most of the length of the support. The largest face 30 of the support, which face corresponds to the large base of the trapezium-shaped cross-section, defines the fastening face on which the cable is fastened. This face is axially recessed from the rear end to the front end portion of the support so as to define a rear cradle 31, an intermediate cradle 32, and an almost front cradle 33, the cradles succeeding one another. The front end portion is provided with a wide front rib 34 projecting axially relative to the fastening face and provided with an axial channel 35. Two longitudinal flats 36 that are plane and substantially at the same level are provided on respective sides of the cradles and of the front rib.

The cross-section of the rear cradle 31 is substantially semi-circular and it matches the largest cross-section of non-stripped cable that can be received on the support. Such a non-stripped cable having the largest possible cross-section is held stationary in the rear cradle 31 by means of a first clamp 37 mounted on the rear cradle and fixed on either side thereof to the two flats 36 by means of two side screws 39 inserted via corresponding holes 39A in the flats and screwed into the clamp.

The cross-section of the intermediate cradle 32 is also semi-circular, and the intermediate cradle is assigned firstly to holding stationary a non-stripped cable of "medium" or "small" cross-section received on the support, and secondly to stopping any reinforcing roving from the cable in the stripped state.

For the purposes of performing its first function of holding stationary the relevant stripped cable, the intermediate cradle receives a second clamp 40 adapted to the cable and fixed on either side to the two flats 36 by means of two screws 41 received via corresponding holes 41A in the flats and screwed into the side portions of the clamp.

For the purposes of performing its second function of stopping roving from the cable, regardless of the cross-section of the cable, and with the cable being stripped just beyond the point at which it is held stationary, the intermediate cradle is provided with two fins 44 projecting relative to the flats 36 and situated between the flats and the intermediate cradle. The roving released from the stripped cable is coiled around the two fins. A notch 45 provided in the front end of each fin over a portion of its height and open facing the almost front cradle 33 receives the roving and retains it. The ends of the coiled roving are locked under the clamp 37 or 40 for holding the non-stripped cable stationary.

The cross-section of the almost front cradle 33 is substantially in the form of a V with a rounded bottom and an opening that is flared more widely than the openings of the preceding cradles 31 and 32. It receives the central strength member 11 of the cable and the fibers 10 which are optionally protected in their tubes and then bared at this cradle.

The front rib 34 is assigned to locking the central strength member. The channel 35 in the rib receives both the end of the strength member which is cut off accordingly, and also a plate 47 or some other abutment part suitable for being pressed against the strength member so as to lock it. The rib is provided with a threaded hole 48 opening out transversely into the channel and receiving a screw 49 for clamping and locking the strength member in the channel.

A semi-circular end shoulder 50 connects the front ends of the flats 36 to the top of the rib 34. Two relatively wide and deep notches 51 are provided in the shoulder 50 and they open out at the periphery thereof on either side of the rib, so as to enable the fibers from the cable held stationary on the support to pass through the shoulder.

The foam pad 13 installed against the front end face of the support 3 has each of its two splits centered on the axis of a respective one of the notches 51, and it holds the fibers without damaging them.

Figure 4:
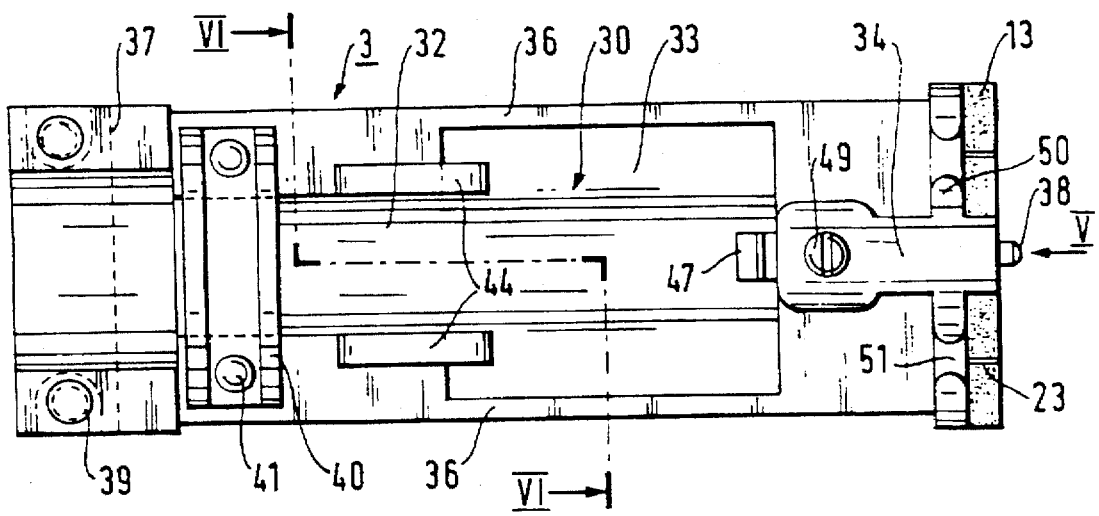
FIG. 4 is a plan view of the fastening support.

As shown in particular in FIG. 4, the rib 34 projects slightly at the front of the support relative to the shoulder 50. This enables the pad to be engaged on either side of the projecting front portion of the rib and against the shoulder 50. The pad is recessed so as fit on either side of rib and it is positioned on the lug 38 which itself projects relative to the front end face, the lug being disposed substantially opposite from the rib on said front end face.

Figure 3:
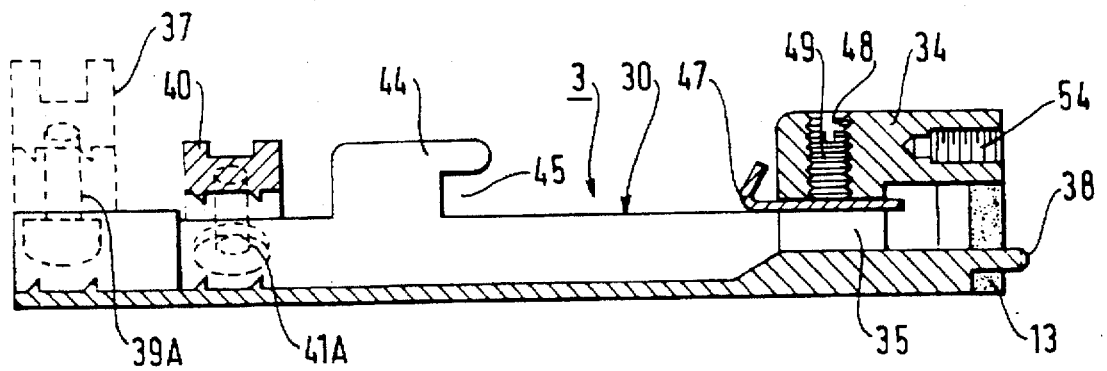
FIG. 3 is a longitudinal section view of a fastening support for fastening an optical fiber cable inside the device shown in FIG. 1.
Figure 5:
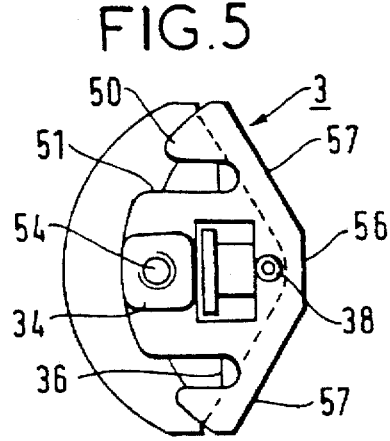
FIG. 5 is a view looking along arrow V shown in FIG. 4 of the non-equipped front end face of the fastening support.

FIGS. 3 and 5 show a threaded hole 54 opening out in the front end face and provided in the rib 34 parallel to the channel and between the channel and the top of the rib. This hole 54 serves to fix the front wedge (not shown) to the support, thereby holding the pad 13 in place.

Figure 6:
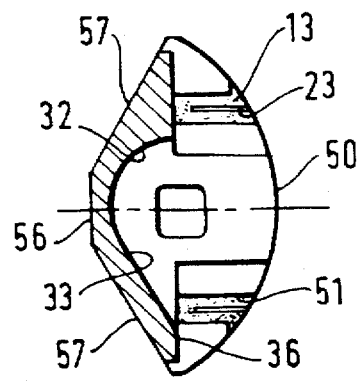
FIG. 6 is a section view of the non-equipped support on staggered line VI—VI shown in FIG. 4.

To complete the description of the support 3, its small face opposite from its fastening face is referenced 56, and both of its sloping side faces are referenced 57, in FIGS. 5 and 6. Faces 56 and 57 are plane and they co-operate to form inclined facets enabling a plurality of supports to be mounted so that they touch one another inside the thimble.

Figure 7:
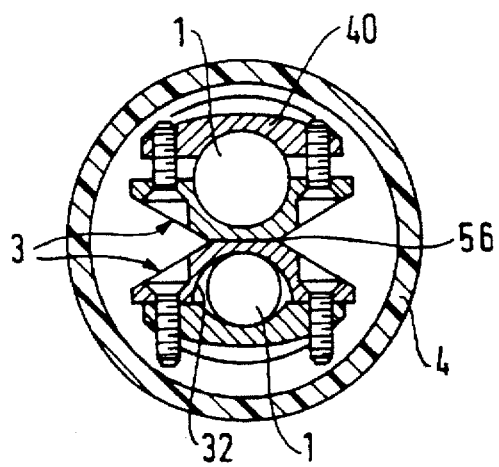
FIG. 7 is a section view of the device shown in FIG. 1, inside which device two cable-fastening supports are mounted, each support fastening a respective cable.
Figure 8:
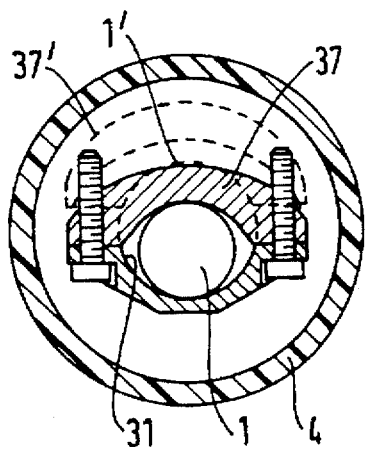
FIG. 8 is a section view of the device having a single fastening support fastening a single cable, the support being substantially centered in the device.
Figure 10:
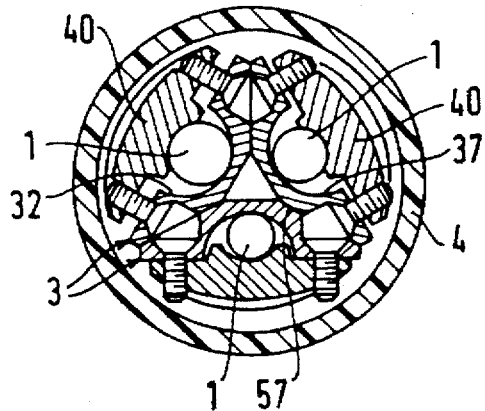
FIGS. 10 and 11 correspond to FIGS. 8 and 9, for use of the device with three cables on their individual fastening supports.

As shown in FIGS. 7, 8, and 10, the width of the fastening face or of the support itself is significantly smaller than the inside diameter of the thimble 4, and the inside of the thimble can receive one, two, or three identical above-mentioned supports designated by the same reference 3, with a cable being held stationary on the fastening face of each support. The cables held stationary on the various supports are analogous to the above-mentioned cable 1, and they are designated by the same reference regardless of the size of their cross-sections, which may be different from one cable to another.

FIG. 7 shows two supports 3 and their respective cables 1 inside the thimble 4. The two supports touch each other via their small bases 56. As shown in FIG. 2, in which the second support 3 in the thimble is shown in dashed lines, the wedge 7 in the form of a bar is fixed to both supports via their front ends, and it locks them in the front opening of the thimble. With reference to FIG. 1, it is easy to understand that the second cable passes through the stuffing box gasket 8 once the plug 18 shown in the passage for the second cable has been removed, and that both cables are locked in the rear opening of the thimble 4. The two cables held in this way are of small or medium cross-section, and they are held stationary in the non-stripped state in the intermediate cradles 32 of the respective fastening faces by the respective corresponding clamps 41.

Figure 9:
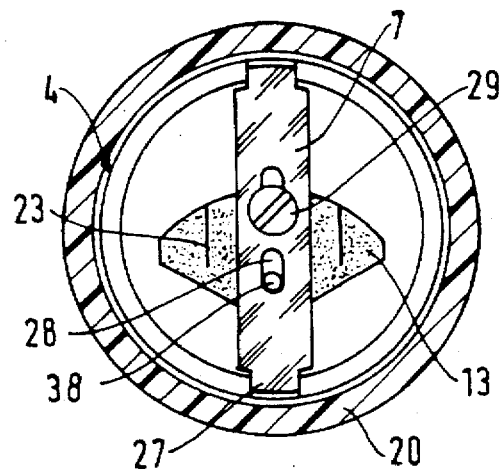
FIG. 9 is a view corresponding to FIG. 2, for the device holding a single cable as shown in FIG. 8.

In FIGS. 8 and 9, the single support 3 carrying its cable 1 is substantially axial inside the thimble 4. The wedge 7 in the form of a bar is fixed to the end of the support by using its two middle holes 28 to hold the support so that it is substantially central in the front opening of the thimble.. The stuffing-box gasket then used in the rear opening of the thimble is provided with a single passage for positioning and holding the single cable in said rear opening. The cable on the support mounted in this way inside the thimble may be of small or medium cross-section. But, as shown, it is preferably of large cross-section, and it is then held stationary in the non-stripped state in the rear cradle 31 by means of the clamp 37.

Furthermore, in dashed lines, FIG. 8 shows the maximum possible cross-section 1' of the cable in the non-stripped state that can be held stationary in the cradle 37, and the corresponding position 37' taken up by the clamp.

Figure 11:
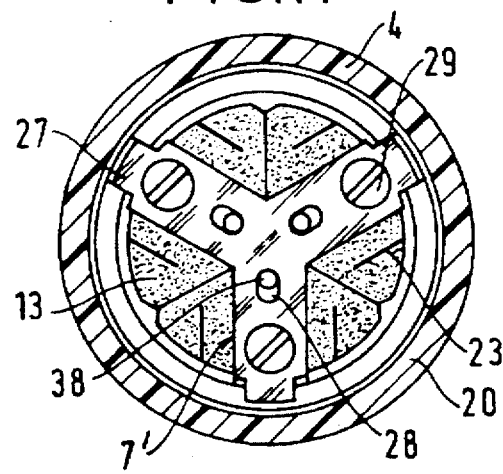

FIGS. 10 and 11 show three supports 3 carrying their respective cables 1 and mounted inside the thimble 4. The supports touch in pairs via their side faces 57. They are held in this way and locked in the front opening of the thimble by an end wedge referenced 7'. This wedge 7' is flat and is star-shaped with three arms that are radial in the front opening. Two holes 28' are provided in each of the radial arms of the wedge so that it can be fixed to the three supports. An end tab 27' is provided on each radial arm of the wedge. The three resulting tabs 27' are received in respective notches 26 in the front end of the thimble, the three notches being provided at 120° from one another, as are the three arms of the wedge. The stuffing-box gasket in the rear opening of the thimble is adapted to receiving the three cables 1 on their respective supports so as to hold the cables and so as to seal the rear opening. The three cables are of relatively small cross-section and they are held stationary in the cradles 32 of the corresponding supports 3.

Figure 12:
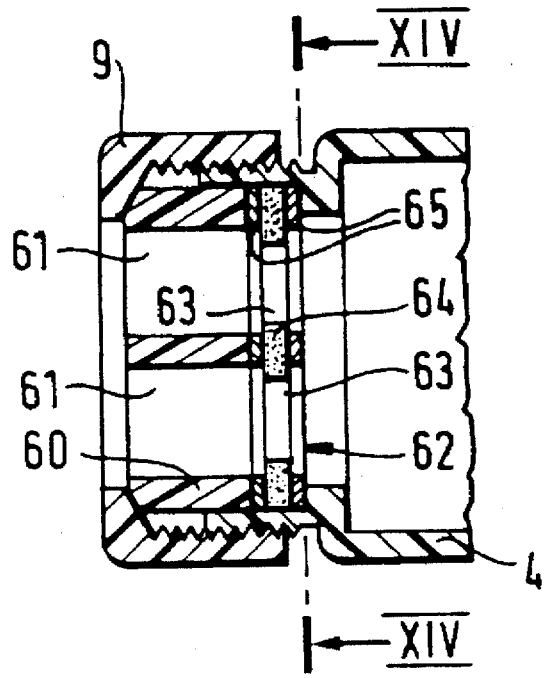
FIG. 12 is a section view of the rear end portion of the device, showing a variant embodiment of the sealing means provided at that end as compared with the embodiment shown in FIG. 1.
Figure 13:
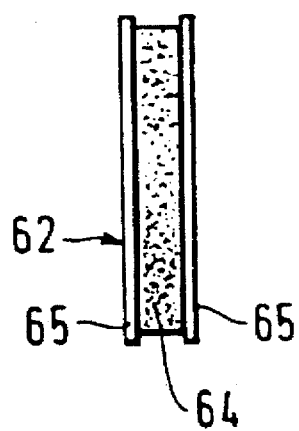
FIG. 13 and FIG. 14 are respectively a side view and a section view on line XIV—XIV shown in FIG. 12 of the sealing means shown in FIG. 12.
Figure 14:
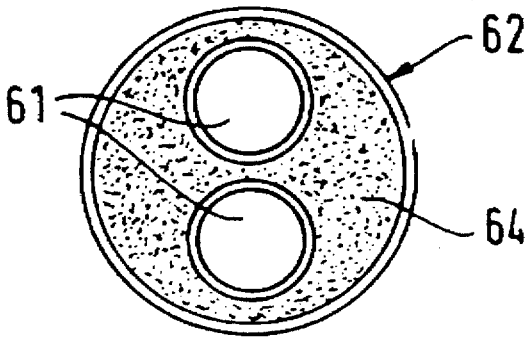

FIGS. 12 to 14 show a variant on the above-mentioned stuffing box for positioning two cables in the rear opening of the thimble 4 and for sealing said rear opening.

In this variant, the sealed closure means for closing the rear portion of the thimble 4 in sealed manner, around two cables in the example shown, include firstly a guide gasket 60 essentially for positioning the two cables in the rear Opening and provided with two passages 61 for the cables, and secondly an associated sealing assembly 62. The sealing assembly 62 is also provided with two passages 63 for the two cables. It is constituted by a gasket 64 made of a sealant, in particular made of butyl rubber or the like, between two metal washers 65. The sealing assembly is mounted touching the gasket 60 and against that face thereof which faces inside the thimble.

The material of the gasket 64 yields considerably so as to creep out over the periphery of the assembly and over the two cables on clamping the assembly by tightening the rear nut 9 fully onto the thimble, so as to provide good sealing at the rear of thimble.

Naturally, other gaskets like gasket 60 and other sealing assemblies like sealing assembly 61 are provided for holding and sealing a single cable and for holding and sealing three cables in the rear opening of the thimble, each gasket and sealing assembly being provided accordingly with a single passage or with three passages for the corresponding cables.

When the thimble is not equipped to its fullest capacity, the non-used passages are plugged.

The sealing gasket 64 between the two washers is changed each time the rear nut is unscrewed. Said sealing gasket is provided with the number of passages that corresponds to the number of cables received in the thimble.

The device of the invention holds from 1 to 3 optical fiber cables, depending on the cross-section of the cable(s), and is provided with integrated direct sealing for the cable(s) that it assigns to the same splice box access. It is easy and quick to mount the thimble on the outside of the splice box and to remove it therefrom, and no tool needs to be used inside the splice box. The thimble may be under-equipped initially, as shown in FIG. 1, and then equipped more fully whenever necessary subsequently. It can be used on different types of splice box having at least one pair of tubular accesses to the outsides of which two devices for holding optical fiber cables can be connected.

Figure 15:
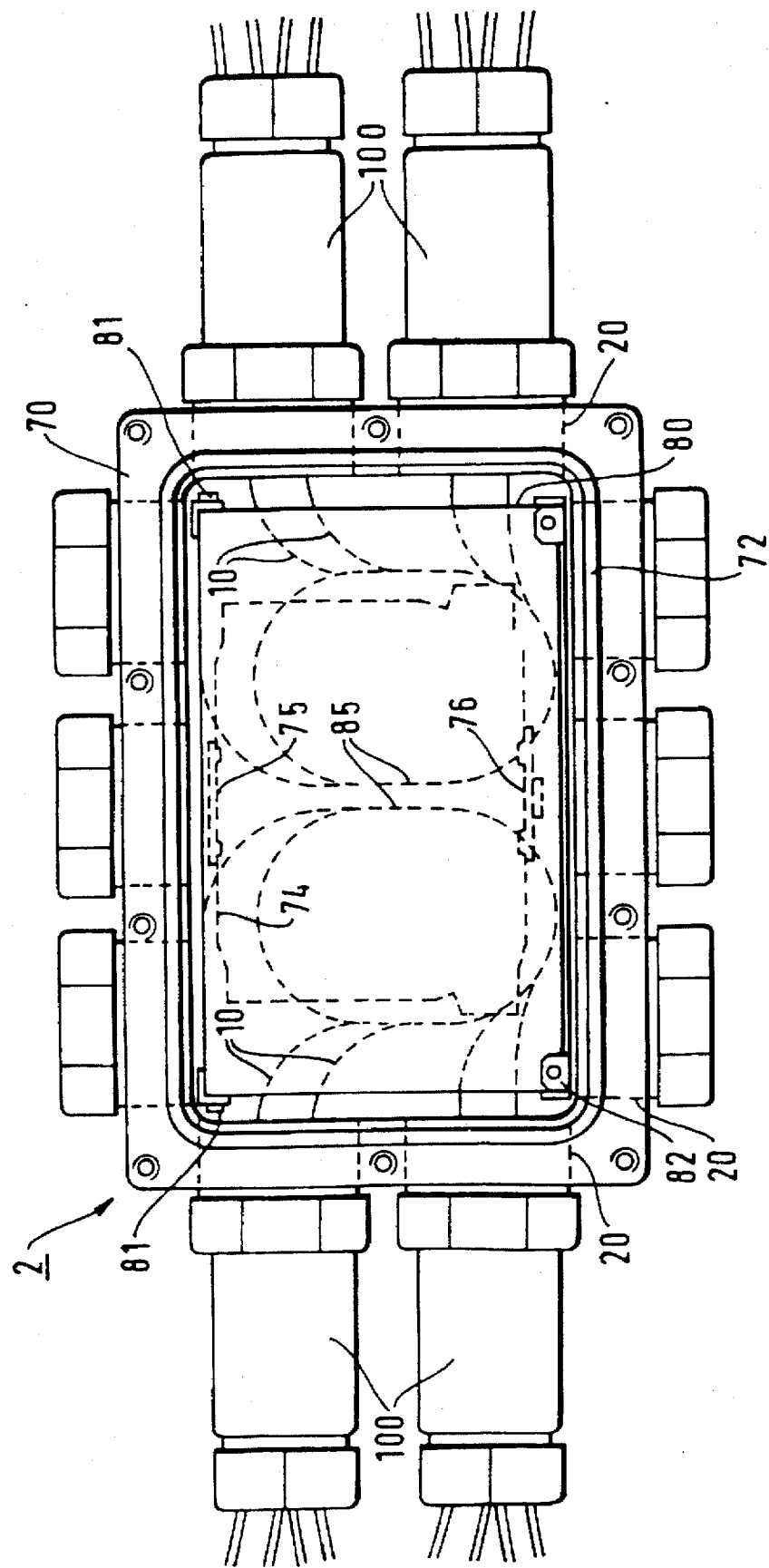
FIGS. 15 and 16 are respectively a plan view of the splice box body in the open and equipped state, and an end view of the splice box in the closed state.
Figure 16:
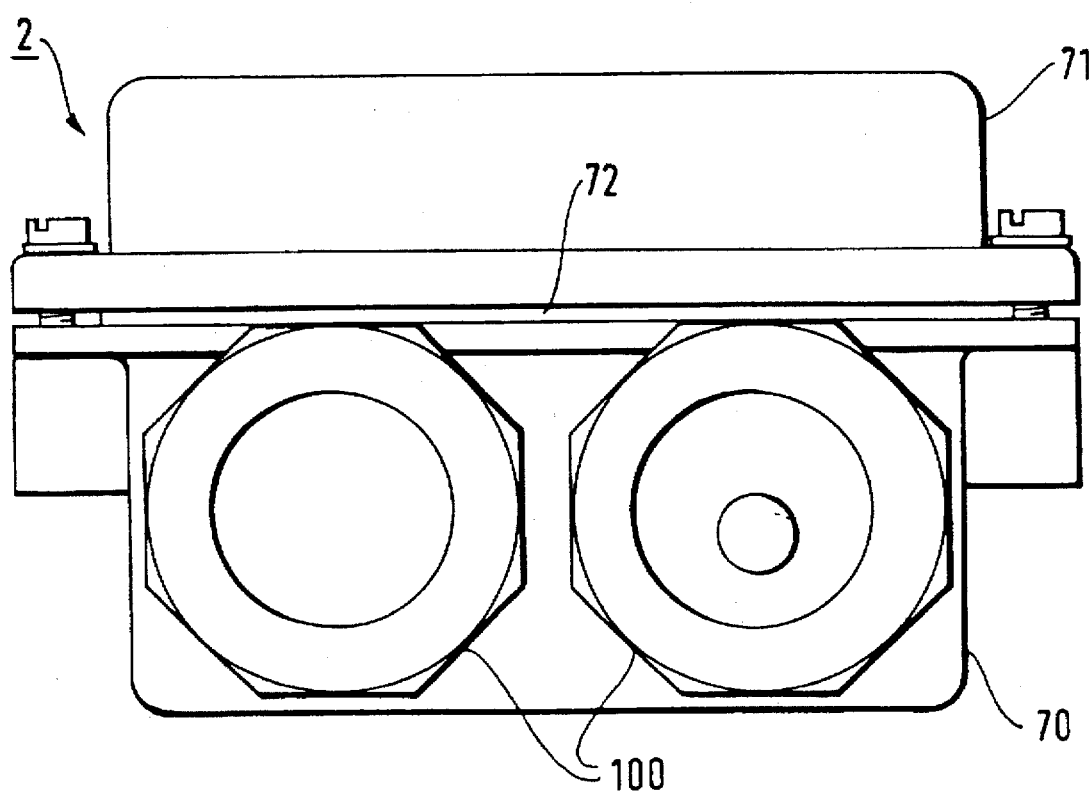

FIGS. 15 and 16 show an embodiment of such a splice box having optimum maximum capacity for the given dimensions of the box.

This splice box is given above-mentioned overall reference 2, and it includes a rectangular-block shaped box body 70 having a "top" one of its large rectangular faces open. The open top face is closed by means of a separate cover 71 that is screwed onto the periphery of the top face of the body. A gasket 72 disposed substantially on the periphery of said top face provides sealing between the body and the cover.

The body 70 carries coiling and splicing cassettes 74 which can be superposed on one another, which are coupled together on a first side by means of a hinge assembly 75 for hinging together the individual cassettes, and which are locked to one another on the side opposite from the first side by means of a locking assembly 76 for locking together the individual cassettes.

In this embodiment, the stack of cassettes is advantageously mounted on a support flap 80 itself hinged substantially along one of the inside edges of the top face of the body so that it can be opened for providing access to the cassettes or closed on the body for holding the cassettes in and/or above the body. Two hinge angle-members 81 and two abutment angle-members 82 are provided for the flap 80 inside the body and at least at the height of the flap therein, at respective ends of two opposite side walls of the body.

The stack of cassettes is under the flap 80 when it is closed onto the body. An empty space is left by the stack at the bottom of the body for coiling a portion of the surplus lengths of fibers received in the splice box. The surplus lengths are coiled at the bottom of the body in two loops 85 for the two sets of fibers received via two opposite sides of the body 70, the loops being retained by suitable means (not shown).

The body 70 has two accesses on each of its small sides and three accesses on each of its large sides, all of the accesses being identical to the access 20 of the splice box shown in FIG. 1, and being designated by the same above-mentioned reference 20.

The accesses make it possible to Use four or six devices for holding optical fibers, depending on the sides used.

In the example shown, the splice box is equipped with four devices 100 such as the device described above with reference to FIGS. 1 to 15, the four devices being mounted on the accesses on the small sides. The non-used accesses on the large sides are closed off in sealed manner by means of caps 101 screwed onto them in manner analogous to the manner in which the front nut of a device is screwed onto an access. The cap 101 is not provided with any holes, and it is equipped with means for sealing the closed-off non-used access.

Naturally, it is possible to use only one of the two accesses on each small side, or one, two, or three of the accesses on each large side, and to close off the non-used accesses in sealed manner. The splice box is accordingly either underequipped or used to its full capacity independently of whether the thimbles themselves are under-equipped or fully equipped.

Naturally, instead of providing accesses on all four sides of the splice box, accesses may be provided on two opposite sides, and imprints for accesses to be cut out and to be provided with individual connectors for connecting to the devices 100 may be provided on the other two sides.

In variants on FIGS. 15 and 16, the splice box may take various possible shapes having at least two opposite accesses for two devices for holding optical fiber cables to be interconnected.

Thus, for interconnecting two cables directly and in-line, the splice box may be constituted by a tubular body inside which a single support is mounted for the splices between the fibers from the two cables, the two ends of the body forming the accesses for the two devices for holding the two cables.

Thus, the splice box may also be a rectangular-block shaped body in two assemblable-together portions, the body protecting a single support directly, the support having one face for coiling the optical fibers and another face for holding the splices, and the body having two opposite accesses for receiving two devices for holding the cables in question.

The splice box shown in the drawings and described above, and the variant embodiments indicated solely by way of example, directly show the possibilities for using the device on different types of splice box, and the ease with which it can be used thereon.

We claim:

1. A device for holding at least one optical fiber cable, the device including a fastening support for each cable, each fastening support including a substantially flat fastening face, is cable clamp for holding the corresponding jacketed cable stationary and for holding a stripped end of said cable thereon with its fibers disposed freely on a front end of said support, said device further including a cylindrical thimble inside which a plurality of identical fastening supports can be mounted for receiving a plurality of corresponding cables, the thimble having open front and rear ends and being organized so that its length is significantly greater than the length of said supports, at least one of said supports being mounted inside said thimble, and each corresponding cable being received therein through said rear end of said thimble after being secured on its support, a front end wedge fixed to the front end of each support inside said thimble and locked in an open front end of said thimble, and closure means for closing the rear end of their thimble, around each cable received in said thimble.

2. A device according to claim 1, wherein the fastening support for fastening each cable is constituted by an elongate part having a large face, which is recessed axially over a portion of the length of said part and which defines the fastening face, and a plurality of small plane faces co-operating to define sloping surfaces for mounting a plurality of supports so that they touch one another inside said thimble.

3. A device according to claim 2, wherein the shape of the right cross-section of said support is substantially an isosceles trapezium whose large base is recessed from a rear end to a front end portion.

4. A device according to claim 3, wherein said fastening face has a rear cradle and an intermediate cradle, one after the other, the two cradles being selectively assigned to holding the cable stationary, depending on the cross-section of the cable, each cradle being associated with a respective clamp for holding the cable stationary.

5. A device according to claim 3, wherein said support is provided with a front end rib projecting axially from the front end portion of the fastening face, and provided with a longitudinal channel, said channel being assigned to locking a central strength member belonging to the cable held stationary on said support.

6. A device according to claim 2, wherein said support has a semi-circular front end shoulder projecting from said fastening face, and provided with peripheral notches for passing the fibers from the cable held stationary on the support.

7. A device according to claim 6, further including a foam front pad held against said semi-circular front shoulder and provided with splits centered on said peripheral notches for passing said fibers.

8. A device according to claim 6, wherein said end wedge is a flat bar that is of length greater than the inside diameter of said thimble, and that is assigned to locking, in the front end of said thimble, a single support or two supports disposed symmetrically to and touching each other, and wherein said thimble is provided with at least two front notches that are diametrically opposite each other, and that receive the ends of said bar.

9. A device according to claim 8, wherein said wedge is provided with pairs of oblong holes for positioning it and fixing it to each support, with clearance being provided to make it possible for each support to be displaced transversely relative to said wedge.

10. A device according to claim 6, wherein said end wedge is a flat star-shaped piece having three radial arms of length greater than the inside radius of said thimble, and assigned to locking, in the front end of the thimble, three supports touching in pairs, and wherein said thimble is provided with at least three front notches for receiving the ends of the three arms.

11. A device according to claim 1, wherein said closure means for closing the rear end of the thimble comprise a stuffing-box basket and a rear nut for clamping said stuffing-box basket in the rear opening of the thimble and around each cable.

12. A device according to claim 1, wherein said closure means for closing the rear end of the thimble comprise a guide gasket for guiding each cable received in the thimble, a sealing assembly associated with said guide gasket, and a rear nut for clamping said guide gasket and said sealing assembly in the rear opening of the thimble and around each cable, and wherein said sealing assembly itself comprises a gasket made of a yielding material between two rigid washers.

13. A splice box using devices according to claim 1 and including a box body and at least two opposite accesses on said body for the optical fiber cables, wherein each device is outside said body and includes front sealed fixing means for fixing said thimble in sealed manner to one of said accesses of the box body.

14. A splice box according to claim 13, in which said box is rectangular, it includes the box body which is open and has a bottom, two small side walls and two large side walls, it is closed by a cover, and it is provided with a plurality of side accesses on said body, wherein said accesses are provided on the small and large side walls of said body, and at least some of the accesses on two opposite side walls are equipped with individual devices for holding optical fiber cables, the other accesses being closed off.

15. A splice box according to claim 14, further including internal means for coiling the surplus lengths of optical fiber, and for holding splice connections, wherein said body further includes retaining means for retaining coiled loops of said fibers substantially on the bottom of said body.

16. A device according to claim 1, wherein each said support includes at least one flat surface on a side opposite said fastening face, such that said plurality of supports can be mounted within said thimble with flat surfaces of each in contact with one another.

17. A device according to claim 1, wherein said cable clamp holds said jacketed cable to said fastening support independently of said thimble.

* * * * *